(12) United States Patent
Aldana et al.

(10) Patent No.: US 10,158,547 B2
(45) Date of Patent: Dec. 18, 2018

(54) METHOD FOR A PROCEDURE FOR DETERMINING DISTANCE OR ANGLE BETWEEN ELECTRONIC DEVICES CONNECTED WIRELESSLY

(71) Applicant: QUALCOMM Incorporated, San Diego, CA (US)

(72) Inventors: Carlos Horacio Aldana, Mountain View, CA (US); Sandip HomChaudhuri, San Jose, CA (US); Santosh Kumar Vamaraju, San Jose, CA (US); Subash Marri Sridhar, San Jose, CA (US); Bernal Arroyo, San Jose, CA (US)

(73) Assignee: QUALCOMM incorporated, San Diego, CA (US)

( * ) Notice: Subject to any disclaimer, the term of this patent is extended or adjusted under 35 U.S.C. 154(b) by 778 days.

(21) Appl. No.: 14/842,418

(22) Filed: Sep. 1, 2015

(65) Prior Publication Data
US 2016/0119805 A1 Apr. 28, 2016

Related U.S. Application Data

(60) Provisional application No. 62/069,143, filed on Oct. 27, 2014.

(51) Int. Cl.
*H04L 12/26* (2006.01)
*H04W 64/00* (2009.01)
(Continued)

(52) U.S. Cl.
CPC .......... *H04L 43/106* (2013.01); *G01S 5/0284* (2013.01); *H04L 67/143* (2013.01); *H04L 67/18* (2013.01); *H04W 64/00* (2013.01)

(58) Field of Classification Search
CPC ..... H04W 36/30; H04W 88/02; H04W 4/021; H04L 61/20
(Continued)

(56) References Cited

U.S. PATENT DOCUMENTS

2014/0073352 A1 3/2014 Aldana et al.
2014/0160959 A1 6/2014 Aldana et al.
(Continued)

OTHER PUBLICATIONS

Aldana C., et al., "802.112012 CID_46_47_48; 11-12-1249-04-000m-802-11-2012-cid-46-47-48", QUALCOMM, IEEE SA Mentor; 11-12-1249-04-000M-802-11-2012-CID-46-47-48, IEEE-SA Mentor, Piscataway, NJ USA, vol. 802.11 m, No. 4, Jan. 17, 2013 (Jan. 17, 2013), pp. 1-17, XP068040038.
(Continued)

*Primary Examiner* — Kiet M Doan
(74) *Attorney, Agent, or Firm* — Silicon Valley Patent Group LLP

(57) ABSTRACT

In a procedure for determining distance (or angle) between a pair of electronic devices wirelessly connected to one another, a current session may be temporarily suspended on request and thereafter the current session may be resumed. Temporary suspension and resumption of the current session may, for example, eliminate starting a new session between the pair of electronic devices and repeating a determination of parameters that were initially agreed upon in the current session. Temporary suspension of a current session may be signaled wirelessly, by one electronic device to the other electronic device, for example, by setting a specific value in a specific field, to signal that the current session is to be paused now, in a frame or message transmitted from the pausing device to the to-be-paused device. The current session may be resumed without repeating determination of the initially-agreed upon parameters, by transmitting a frame to initiate measurement exchange.

26 Claims, 10 Drawing Sheets

(51) Int. Cl.
*H04L 29/08* (2006.01)
*G01S 5/02* (2010.01)

(58) Field of Classification Search
USPC ......... 455/517, 456.3, 522, 436, 456.1, 411; 370/252, 336, 255, 329
See application file for complete search history.

(56) References Cited

U.S. PATENT DOCUMENTS

| | | |
|---|---|---|
| 2014/0187259 A1 | 7/2014 | Kakani et al. |
| 2014/0200036 A1* | 7/2014 | Egner .................. H04W 8/245 455/456.3 |
| 2014/0286324 A1 | 9/2014 | Aldana et al. |
| 2014/0355462 A1 | 12/2014 | Aldana et al. |
| 2015/0099538 A1 | 4/2015 | Wang et al. |
| 2015/0139212 A1 | 5/2015 | Wang et al. |
| 2015/0372485 A1* | 12/2015 | Borean .................. G01D 4/00 700/275 |

OTHER PUBLICATIONS

International Search Report and Written Opinion—PCT/US2015/052411—ISA/EPO—dated Dec. 4, 2015.

* cited by examiner

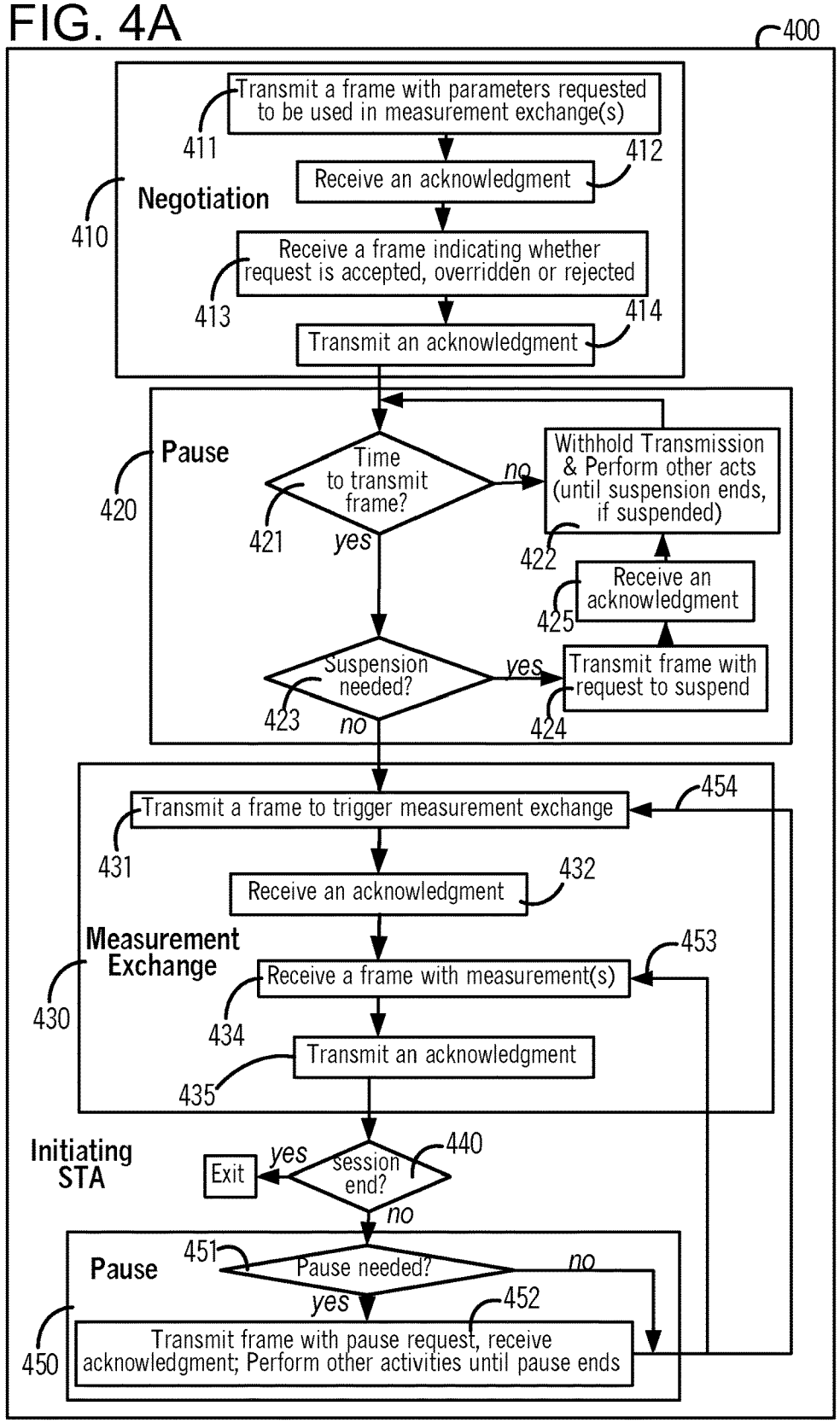

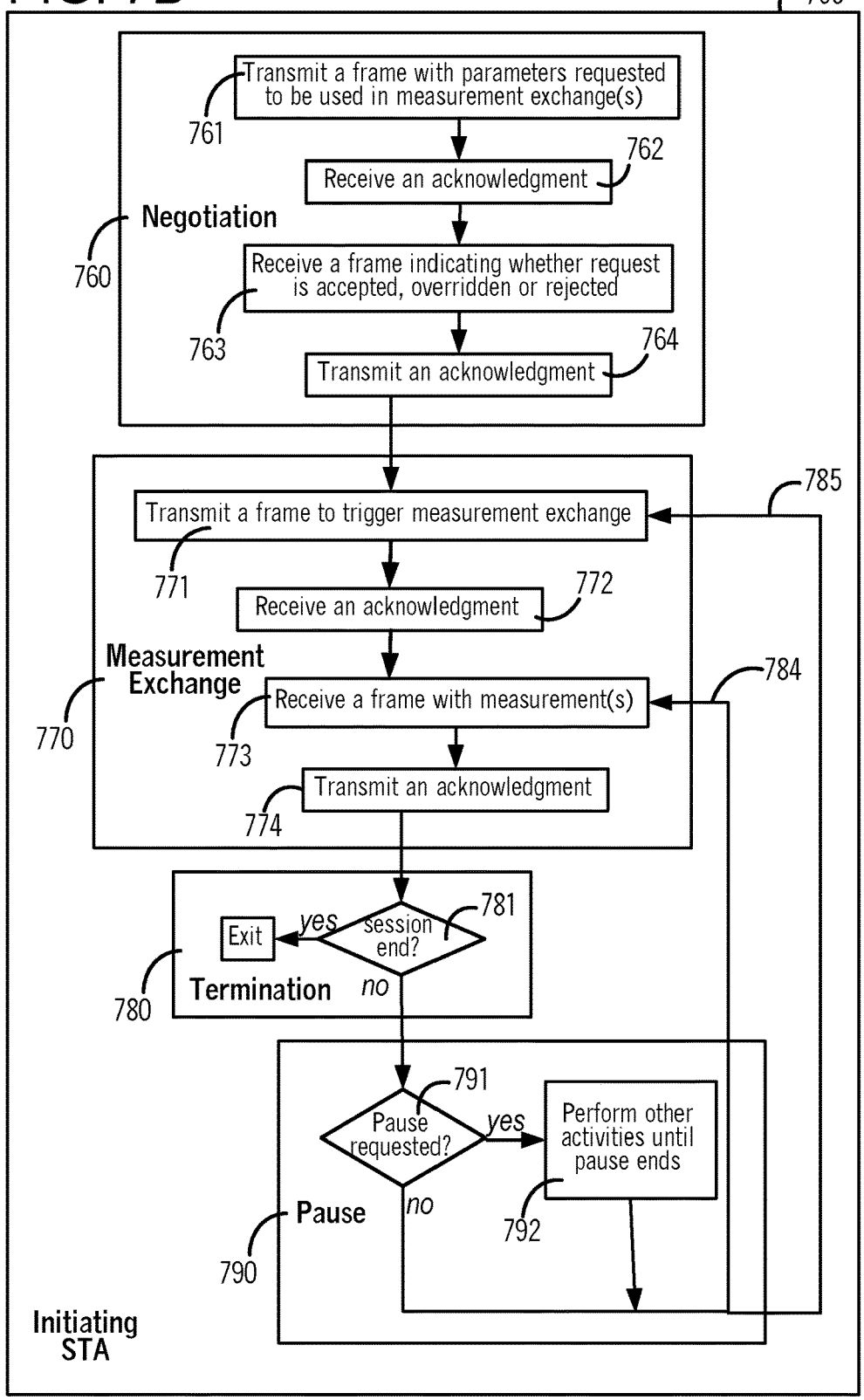

1100

```
Determining a plurality of parameters for a phase to
exchange measurements, wherein the plurality of parameters
identify multiple sets of wireless signals scheduled to be
transmitted during the phase to exchange measurements by a
first electronic device, a second electronic device, or a
combination of the first electronic device and the second
electronic device                                        1102
```

```
Receiving or transmitting an indication to temporarily
suspend participating in the phase to exchange measurements
during a current set of wireless signals among the multiple sets
of wireless signals                                      1104
```

```
Based on the indication to temporarily suspend
participation in the phase to exchange measurements,
withholding transmission of one or more of the multiple sets of
wireless signals scheduled to be transmitted             1106
```

```
Transmitting or receiving a new set of wireless signals
among the multiple sets of wireless signals, the new set of
wireless signals being scheduled to be transmitted subsequent to
the one or more of the multiple sets of wireless signals.
                                                         1108
```

FIG. 9

METHOD FOR A PROCEDURE FOR DETERMINING DISTANCE OR ANGLE BETWEEN ELECTRONIC DEVICES CONNECTED WIRELESSLY

CROSS-REFERENCE TO PROVISIONAL APPLICATION

This application claims the benefit of and priority to U.S. Provisional Application No. 62/069,143 filed on Oct. 27, 2014 and entitled "METHOD FOR PAUSING A PROCEDURE FOR DETERMINING DISTANCE OR ANGLE BETWEEN ELECTRONIC DEVICES CONNECTED WIRELESSLY", which is incorporated herein by reference in its entirety.

BACKGROUND

This patent application relates to electronic devices that communicate with one another wirelessly, such as mobile devices and transceivers at fixed locations that are connected wirelessly, e.g. via a wireless local area network (such as IEEE standard 802.11) or a wireless personal area network (such as the standard Bluetooth or IEEE standard 802.15.1), just to name a few examples. It may be beneficial for a pair of such electronic devices to exchange timing measurements, for use in determining one or more positional relationships, such as, for example, a distance or angle between the electronic devices.

To do so, an electronic device comprising a wireless transceiver (which may be at a fixed or otherwise known location) may, for example, transmit wireless signals to a mobile device (such as a cell phone or a laptop), for example, over a forward link. The electronic device may receive wireless signals from the mobile device, for example, over a reverse link. Such exchanges of wireless signals may allow the transmitting and receiving devices to measure or otherwise obtain certain signaling and/or timing characteristics of the wireless signals, some of which may be useful in determining one or more positional relationships, such as, for example, a distance or angle between the two devices. The exchange of such wireless signals may conform to a standard for wireless local area networks (Wireless LANs), such as Fine Timing Measurement procedure, described in section 10.24.6 of the IEEE 802.11 Standard for Information technology—Telecommunications and information exchange between systems, Local and metropolitan area networks—Specific requirements, Part 11: Wireless LAN Medium Access Control (MAC) and Physical Layer (PHY) Specifications.

SUMMARY

The inventors of the current patent application recognize that starting of a new session between a pair of electronic devices after stopping a partially-conducted session, in a procedure to determine at least one positional relationship (e.g. distance or angle) may involve repeating at least a portion of the partially-conducted session, even when there is no difference in parameters used in the two sessions, because at least some parameters that are initially determined (e.g. by negotiation) in the partially-conducted session are normally required to be exchanged again for the new session. The inventors believe that repetition of parameter determination can be eliminated, by temporarily suspending a current session (by withholding transmission of one or more signals in at least a current set of signals that are scheduled as per parameters of the current session) and resuming with any new set of wireless signals in the current session without repeating determination of parameters (e.g. by re-negotiating), as described below.

In several aspects of described embodiments, in a procedure for determining at least one positional relationship (e.g. distance or angle) between a pair of electronic devices connected to one another wirelessly, a measurement exchange phase in a current session may be temporarily suspended by signaling an end of a current set of wireless signals prior to its completion, followed by a temporary suspension during which transmission is withheld, of one or more measurements in one or more signals ("missing signals") originally scheduled to occur in the current set of wireless signals. After the temporary suspension, the current session may be resumed without transmission of the missing signals in any new set of wireless signals that were originally scheduled.

In some situations, the current session may be resumed in a set of wireless signals that immediately follows the current set of wireless signals, in which case the temporary suspension within the current session simply ends at the end of the current set of wireless signals. In the just-described situations, transmission of one or more measurements is withheld in the current set of wireless signals, because at the end of the current set one or more signals there were originally scheduled to occur are not transmitted, which constitute missing signal(s). In other situations, the current session may be resumed only after one or more intervening set(s) of wireless signals ("preempted signal sets") between the current set of wireless signals and the new set of wireless signals do not occur, although scheduled to occur as per parameters initially determined (e.g. by negotiation), wherein missing signals may occur at the end of the current set and/or in one or more preempted signal sets. On resumption, the new set of wireless signals may continue to use parameters that were determined initially and used in the current set of wireless signals, until temporary suspension of the current session, e.g. by each electronic device saving the parameters in a non-transitory computer-readable storage medium while the current session is temporarily suspended.

Temporarily suspending and resuming a current session by ending the current set of wireless signals, followed by exchanging measurements in a new set of wireless signals of the current session may, for example, eliminate starting a new session between the same pair of electronic devices, which in turn eliminates repeating an initial determination of parameters (e.g. by repeating negotiation), thereby reducing time otherwise required to perform a positional relationship determination procedure. Accordingly, in the positional relationship determination procedure, a device (e.g. an initiating STA) does not receive the missing signals and thus does not use certain measurements ("withheld measurements"), whose transmission does not occur (in the current set of wireless signals and/or in one or more preempted signal sets) although their transmission is originally scheduled.

In several aspects of described embodiments, temporary suspending and resuming of a current session may be signaled wirelessly, by one electronic device ("preempting device") to the other electronic device ("preempted device" also called "device to be preempted"), in any manner, which may be different depending on the embodiment. For example, a predetermined value may be set in a predetermined field, to signal that the current session is to be temporarily suspended now by ending transmission of a current set of wireless signals, in a frame or message transmitted from the preempting device to the device to be preempted ("preemption frame"). Depending on the embodiment, the current session may be resumed in any new set of wireless signals (of the current session), by a preempted device without determination of parameters used in timing measurements, synchronously at a specific time at which the new set of wireless signals is to start, e.g. based on the new set of wireless signals being identified in the preemption frame. Alternatively, the current session may be resumed asynchronously by the preempted device, in response to receipt of another frame or message transmitted from the preempting device to the preempted device ("re-starting frame").

The signal to indicate temporary suspension of a current session (also called "indication") may be present at any location in a preemption frame, for example depending on a role of one device (the preempting device), in initiating the procedure for determining positional relationship between itself and another device (the device to be preempted). For example, a preempting device that starts the positional relationship determination procedure (e.g. an initiating STA) may transmit this signal using an unused (or reserved) value, in any particular field in a preemption frame (e.g. a trigger field), with values of all bits in the particular field being described in a published industry standard (e.g. the 802.11 standard). As another example, a preempting device (e.g. a responding STA) that responds to initiation of the procedure may re-define an existing definition of a specific single bit, in a specific field (e.g. an error field) in the preemption frame, with all bits in the specific field being defined in the published industry standard.

In certain embodiments, a new field may be added to an existing frame, for use in signaling by the preempting device (e.g. a responding STA) that a current session is being temporarily suspended, the existing frame being defined in the published industry standard. In some embodiments, one or more fields and/or bits used in starting or ending a temporary suspension in a current session may be determined ahead of time (i.e. predetermined), e.g. in a new proposal by current inventors for revising the published industry standard. In certain embodiments, one or more fields and/or bits used in starting or ending the temporary suspension may be determined dynamically (i.e. not predetermined), e.g. during an initial phase of the procedure.

In addition to the above-described field(s), a preemption frame of the type described above, may, for example, contain information normally present as per a published industry standard, e.g. one or more timing measurements, such as measurement of a time of arrival of an earlier frame (or acknowledgment) at the preempting device and/or measurement of time of departure of another earlier frame (or acknowledgment) from the preempting device. Alternatively, the preemption frame, may, for example, contain one or more differences in timing measurements, such as a difference between the just-described time of arrival measurement and time of departure measurement at the preempting device.

A time of arrival measurement may identify an earliest time that an earlier frame transmitted by the preempted device is received at one or more antennas of the preempting device. Alternatively, the time of arrival measurement may identify an arrival time of the earlier frame, at whichever one of the receive antennas of the preempting device has highest received signal strength among all of the receive antennas of the preempting device. In yet another embodiment, the time of arrival measurement may identify a weighted sum of one or more arrival times of the earlier frame at one or more receive antennas of the preempting device.

A time at which a current session that is now temporarily suspended is to resume may be indicated, for example by either electronic device in the pair to the other electronic device in the pair in different ways, depending on the embodiment. Hence, one or more field(s) in a preemption frame or in a different frame or message ("temporary suspension-duration frame") may indicate, for example: (1) a specific time at which the current session is to resume, or (2) a duration, for example from a time at which a temporary suspension begins, or from a time at which a current set of wireless signals began, or (3) a number of signal sets, over which the current session is temporarily suspended. Other embodiments may use a different frame (or message) to indicate temporary suspension duration. Depending on the embodiment, a temporary suspension-duration frame may be transmitted after transmission of the preemption frame, or even before transmission of the preemption frame (e.g. during an initial phase to determine parameters).

Hence, several embodiments of the type described herein, enable either of the two electronic devices (e.g. an initiating STA or a responding STA) to respond to changes in the environment or to enter a power save mode for example, or to process a concurrency situation in which another channel needs to be visited, by temporarily suspending the procedure to determine a positional relationship between the devices, without again determining the parameters to now be used in exchanging measurements. By sending a temporary suspension request, either of the two electronic devices may temporarily suspend participation in a current session of exchanging measurements in any current set of wireless signals for any reason, and resume exchanging measurements in the current session in any subsequent set of wireless signals, e.g. using the same parameters as agreed upon in a single parameter determination phase initially in the current session (or using parameters newly-specified in a frame that re-starts measurement exchange), eliminating an additional parameter determination phase (e.g. by negotiation) required in starting a new session which saves time.

It is to be understood that several other aspects of the embodiments will become readily apparent to those skilled in the art from the description herein, wherein it is shown and described various aspects by way of illustration. The drawings and detailed description below are to be regarded as illustrative in nature and not as restrictive.

BRIEF DESCRIPTION OF DRAWINGS

FIGS. 4A and 4B illustrate, in flow charts, acts performed by an initiating STA and a responding STA (e.g. by one or more processor(s) in each STA executing a plurality of instructions), when exchanging frames as illustrated in FIG. 1.

FIGS. 7A and 7B illustrate, in flow charts, acts performed by an initiating STA and a responding STA, when exchanging frames as illustrated in FIG. 5.

FIG. 9 illustrates, in a flow chart, an example method that may be implemented in a first electronic device for use in determining at least one positional relationship between itself and a second electronic device, in accordance with certain embodiments of the present disclosure.

DETAILED DESCRIPTION

In several aspects of certain embodiments, a pair of electronic devices 101 and 102, such as an access point and a laptop (FIG. 1) may connect to one another wirelessly, and perform a procedure to determine at least one positional relationship (e.g. distance or angle) there between, in a current session (also called "1st session") that exchanges one or more sets of wireless signals, such as the set of wireless signals 111A. At any stage, this current session may be suspended temporarily, between the pair of electronic devices 101 and 102. Temporary suspension of the current session may be for any period of time, during which the pair of electronic devices 101 and 102 withhold transmission of one or more signals that were scheduled to occur in the current session ("missing signals"), for use in exchanging measurements, of time at which these signals are sent and received. After the period of temporary suspension, the current session may be resumed (without the missing signals), by the pair of electronic devices 101 and 102 exchanging a set of wireless signals 111B. The set of wireless signals 111B are exchanged in accordance with parameters that were agreed upon between the pair of electronic devices 101 and 102 in a negotiation phase that occurred during exchange of the set of wireless signals 111A (which parameters may have been used in one or more measurement phases, until the temporary suspension of the current session).

Figure 1:
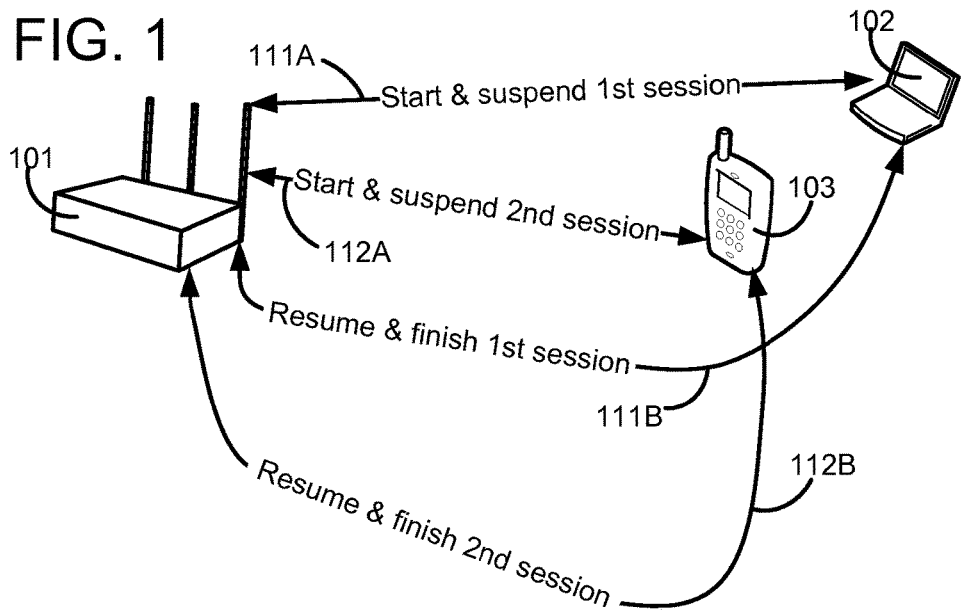
FIG. 1 illustrates, in a high-level data flow diagram, a first session being started and suspended by exchange of wireless signals 111A between a first pair of electronic devices 101, 102 followed by a second session being started and suspended by exchange of wireless signals 112A between a second pair of electronic devices 101, 103 followed by resumption of the first session by exchange of wireless signals 111B followed by resumption of the second session by exchange of wireless signals 112B in accordance with several aspects of certain embodiments of the present disclosure.

During the period of temporary suspension, each device in the pair of electronic devices 101 and 102 may perform any activities other than transmitting the missing signals to one another. Specifically, as illustrated in FIG. 1, during the above-described period of temporary suspension, electronic device 101 may start a new session (also called "2nd session") to exchange another set of wireless signals 112A with another electronic device 103, such as a mobile device. The set of wireless signals 112A may be transmitted in a second channel which is different from a first channel in which the set of wireless signals 111A are transmitted (although these two sets of wireless signals 111A and 112A may be transmitted in a common shared channel, in certain alternative embodiments).

The just-described new session may itself be suspended, in some examples, for a period of time, during which the above-described current session is resumed. Specifically, as shown in FIG. 1, the pair of electronic devices 101 and 102 may exchange a set of wireless signals 111B as originally scheduled in a negotiation phase in the above-described current session, during a period of time when the new session is suspended. Completion of the current session, by exchange of the set of wireless signals 111B is followed by resumption of the new session, by the pair of electronic devices 101 and 103 exchanging the set of wireless signals 112B as originally scheduled in a negotiation phase of the new session, during exchanging of the set of wireless signals 112A.

Figure 2A:
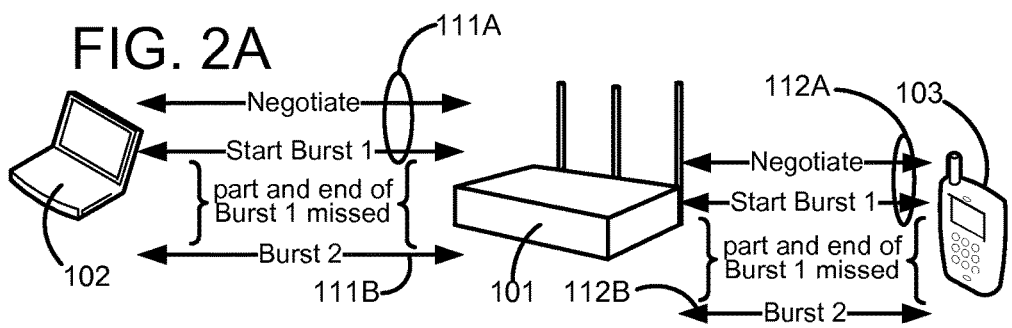
FIG. 2A illustrates, in an intermediate-level data flow diagram in accordance with certain embodiments of the present disclosure, an example wherein measurement signals in the middle and end of an originally-scheduled Burst 1 are missed due to a period of suspension between exchange of wireless signals 111A and 111B by the first pair of electronic devices 101, 102, and similarly measurement signals of another originally-scheduled Burst 1 are missed due to another period of suspension between exchange of wireless signals 112A and 112B by the second pair of electronic devices 101 and 103.

In some aspects of illustrative embodiments, a set of wireless signals 111A that are exchanged in a current session include signals of a negotiation phase as shown in FIG. 2A, followed by signals that are scheduled (based on agreed-upon parameters) to occur at specific times in a burst of a measurement phase, e.g. Burst 1. Prior to completion of such an on-going burst (e.g. Burst 1), the current session may be temporarily suspended, by electronic device 101 (such as an access point) sending a predetermined signal (e.g. a temporary suspension-identifying frame) to electronic device 102. The just-described signal is shown in FIG. 2A as being included, in the set of wireless signals 111A. Thus, a part and the end of Burst 1 in the current session may be missed during the period of temporary suspension ("missing signals").

The just-described temporary suspension period is followed by the pair of electronic devices 101 and 102 (FIG. 2A) exchanging a set of wireless signals 111B, in another burst in the same measurement phase or in another measurement phase, e.g. Burst 2, as scheduled originally (as per agreed-upon parameters, between the pair of electronic devices 101 and 102). As illustrated in FIG. 2A, before exchanging the set of wireless signals 111B, electronic device 101 may suspend a new session that may have been started with electronic device 103, by sending a predetermined signal to electronic device 103, resulting in missing a part and the end of Burst 1 in the new session, before exchanging the set of wireless signals 112B in the new session (for Burst 2 therein).

Figure 2B:
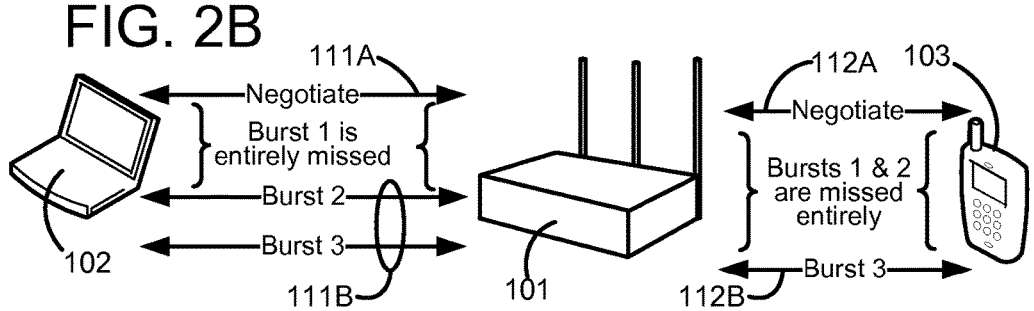
FIG. 2B illustrates, in another intermediate-level data flow diagram in accordance with some embodiments of the present disclosure, another example wherein all measurement signals of an originally-scheduled Burst 1 are missed due to a period of suspension between exchange of wireless signals 111A and 111B by the first pair of electronic devices 101, 102, and similarly all measurement signals of originally-scheduled Bursts 1 and 2 are missed due to another period of suspension between exchange of wireless signals 112A and 112B by the second pair of electronic devices 101 and 103.

Although only a part and end of Burst 1 between the pair of electronic devices 101 and 102 and between the pair of electronic devices 101 and 103 are shown as being missed in FIG. 2A, depending on the situation, the very first signal of Burst 1 may be the predetermined signal (e.g. a temporary suspension-identifying frame) in which case all the measurement signals in Burst 1 may be missed entirely, as shown in FIG. 2B (and in FIG. 3, described below). Moreover, depending on the example, multiple bursts may be missed, e.g. measurement signals of Burst 1 and of Burst 2 may both be missed entirely, during a temporary suspension period in the new session, after which the set of wireless signals 112B are exchanged between the pair of electronic devices 101 and 103 (FIG. 2B).

Depending on the embodiment, any electronic device which includes a wireless transceiver, e.g. any of electronic devices 101-103 shown in FIGS. 1, 2A and 2B described above, may be operated as a wireless station (abbreviated as STA), such as an initiating STA or as a responding STA. Thus, any STA of the type described below may comprise a mobile device (such as a cellular phone), or a stationary transceiver (e.g. IEEE std. 802.11 access point). Although for illustrative purposes, a set of wireless signals are described and illustrated as occurring between a mobile device and a stationary transceiver (as shown in FIGS. 1, 2A and 2B), such wireless signal sets may be exchanged in other embodiments between two mobile devices, or between two stationary transceivers.

The exchange of two or more sets of wireless signals, such as wireless signals 111A, 111B, 112A, 112B shown in FIGS. 1, 2A and 2B may conform to a standard for wireless local area networks (Wireless LANs), such as Fine Timing Measurement procedure, described in section 10.24.6 of the IEEE 802.11 Standard for Information technology—Telecommunications and information exchange between systems, Local and metropolitan area networks—Specific requirements, Part 11: Wireless LAN Medium Access Control (MAC) and Physical Layer (PHY) Specifications. Thus, techniques described herein may incorporate one or more aspects of the IEEE 802.11 Standard. Hence, an initiating STA and/or a responding STA may obtain or compute one or more measurements indicative of positional relationship, based at least in part on time stamps of transmission or receipt of messages or frames between the responding STA and the initiating STA. In such aspects of some described embodiments that conform to IEEE 802.11, the terms "message" and "frame" are interchangeable. Thus, one STA may transmit a fine timing measurement request message or frame to another STA, and subsequently receive a fine timing measurement request message acknowledgement message or frame ("ACK") which is transmitted in response thereto.

Figure 3:
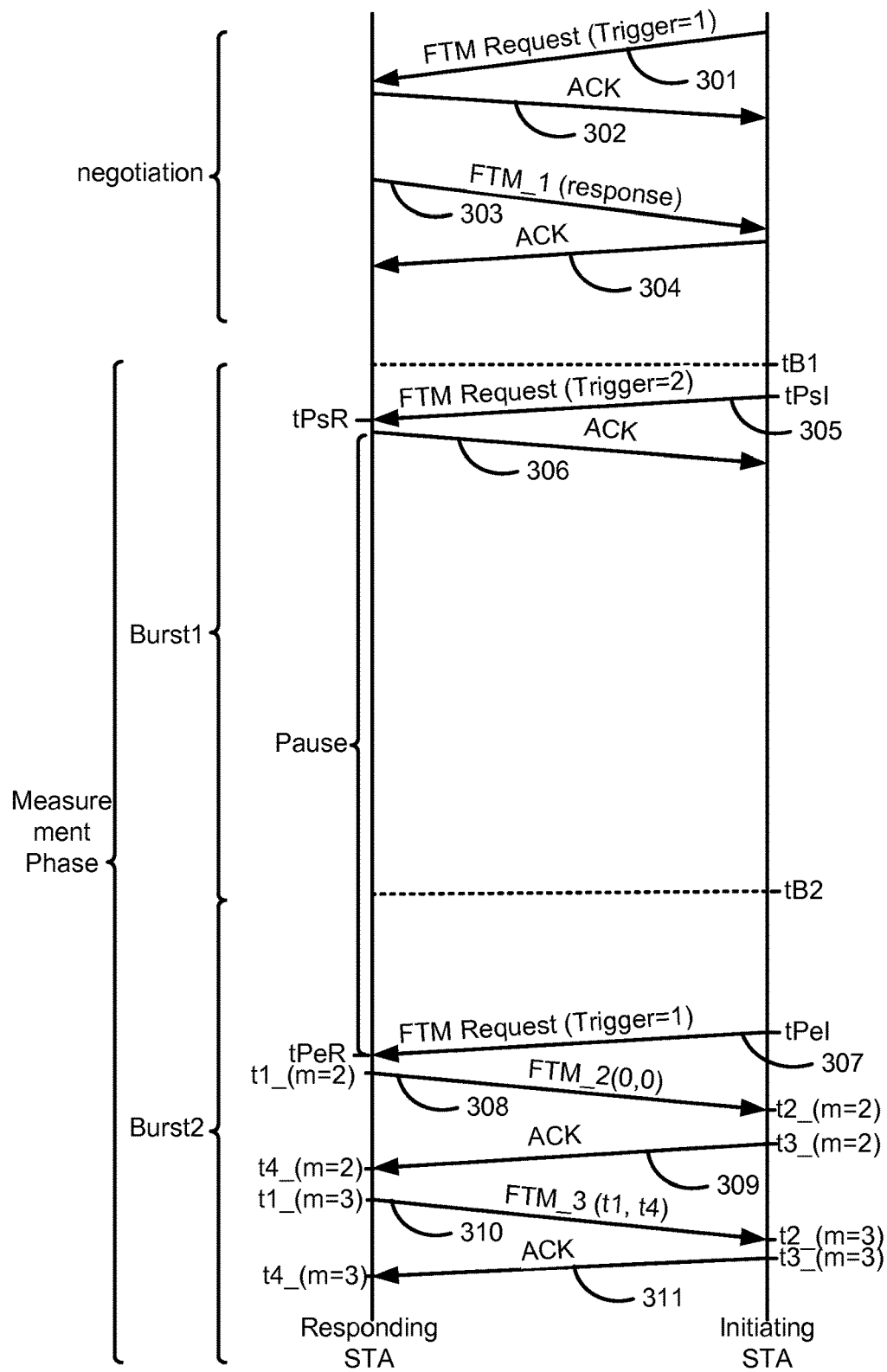
FIG. 3 illustrates a sequence of frames exchanged between an initiating STA and a responding STA in accordance with certain embodiments of the present disclosure.

In a method to determine a positional relationship (e.g. distance and/or angle) by use of timing measurements, as illustrated in FIG. 3, after parameter determination (e.g. by negotiation) in a normal manner (e.g. by exchanging one or more frames 301, 302, 303 and 304 in a current session), at any time in a phase to exchange measurements (which includes multiple sets of wireless signals, wherein a first set of wireless signals Burst1 is scheduled to start at time tB1), an initiating STA may request in a frame 305 that a responding STA temporarily suspend exchange of messages or frames in the current session (by withholding signal transmission). Specifically, in FIG. 3, the initiating STA transmits frame 305 at time tPsI, during the first set of wireless signals Burst1 (also referred to as "current" signal set). The initiating STA may make this request by setting a predetermined value (e.g. the value 2) in a predetermined field (e.g. in the field "trigger") in frame 305 ("temporary suspension-identifying frame") that is wirelessly transmitted from the initiating STA (which is a temporary suspension—requesting device or preempting device, also referred to as a specific device) to the responding STA (which is referred to as a to-be-preempted device before receipt of the temporary suspension-identifying frame, and also referred to as a preempted device thereafter). Frame 304 (which may be a temporary suspension-identifying frame) is received at time tPsR by the responding STA, which transmits an ACK 306 (see FIG. 3), followed by a temporary suspension during which no further transmissions are made to the initiating STA, although one or more transmissions may be scheduled, as per parameters that were initially determined (e.g. exchanged in negotiation).

After completion of the temporary suspension in a current session (by withholding signal transmission), the initiating STA may wirelessly transmit another frame 307 ("temporary suspension-ending frame") with a different value (e.g. value 1) in the specific field (e.g. in the field "trigger"). Specifically, in FIG. 3, the initiating STA transmits frame 307 at time tPeI, during the second set of wireless signals Burst2 (also referred to as "new" set of wireless signals) which was scheduled to start at time tB2. Frame 307 (which may be a temporary suspension-ending frame) is received by the responding STA at time tPeR. During the temporary suspension between times tPsR and tPeR, the responding STA does not transmit any frames to the initiating STA, by withholding transmission of one or more signals, called missing signals which were scheduled to occur, based on parameters that were initially determined. Receipt of frame 307 (which may be a temporary suspension-ending frame) is followed by one or more transmissions that were originally scheduled as per parameters that were initially determined (e.g. exchanged in negotiation) e.g. by responding STA transmitting at time t1_(m=2) FTM_2, a frame 308, followed by receipt at time t4_(m=2) of ACK 309, followed by responding STA transmitting at time t1_(m=3), FTM_3 frame 310 including new measurements therein (e.g. time t1_(m=2), and time t4_(m=2)), followed by receipt at time t4_(m=3) of ACK 311.

During the temporary suspension between times tPsR and tPeR, one or more measurements that were originally scheduled to be performed during the temporary suspension, either in the current set of wireless signals Burst1 or in set of wireless signals Burst2 as per parameters that were initially determined (e.g. exchanged in negotiation), are not made by the responding STA ("withheld measurements"). Hence, no such withheld measurements are transmitted by the responding STA to the initiating STA. Instead, during the temporary suspension (i.e. between times tPsR and tPeR), the responding STA may perform any activities other than transmitting frames to the initiating STA, e.g. the responding STA may transmit frames to other devices and/or perform one or more activities internal to the responding STA, such as determining position and/or angle of other devices. Similarly, between times tPsI and tPeI, the initiating STA may perform any activities other than receiving frames from the responding STA. Specifically, between times tPsI and tPeI, the initiating STA may perform activities that have higher precedence than an FTM session, e.g. data transfer interaction with an associated access point.

Hence, as shown in FIG. 3, no new session is started after temporarily suspending a current session, prior to any new exchange of frames as originally scheduled in the current session. Although in FIG. 3, frame 305 (which may be a temporary suspension-identifying frame) is transmitted in current set of wireless signals Burst1 and frame 307 (which may be a temporary suspension-ending frame) is transmitted in new set of wireless signals Burst2 that immediately follows current set of wireless signals Burst1, depending on the duration of temporary suspension two such frames may be transmitted within two signal sets that are separated from one another by one or more intervening signal sets originally scheduled to occur in the current session, as per parameters that were initially determined (e.g. exchanged in negotiation). However, such intervening signal set(s), if any, are preempted by the temporary suspension, and are also referred to herein as preempted signal set(s).

In certain embodiments of the type illustrated in FIG. 3, the Trigger field set to value 1 in any frame indicates that the initiating STA requests that the responding STA start or continue sending Fine Timing Measurement frames. In several such embodiments, the Trigger field may be set to value 2 in any frame 301 (FIG. 3) to indicate that the initiating STA requests that the responding STA to temporarily suspend (e.g. withhold) sending Fine Timing Measurement frames, and maintain the ongoing FTM session by storing parameters in a non-volatile computer-readable storage medium, such as a random access memory (RAM). The temporarily suspended FTM session may then be resumed (i.e. continued as if there was no lapse in time) by the initiating STA sending a frame 307 (which may be a Fine Timing Measurement Request frame, see FIG. 3) with Trigger field set to value 1. In some embodiments, the Trigger field set to value 0 indicates that the initiating STA requests that the responding STA stop sending Fine Timing Measurement frames and terminate the FTM session after which a new session must be started (including an initial phase to determine parameters to be used in the new session). Although value 2 of the Trigger field is described above as being predetermined for use to request a temporary suspension (by withholding signal transmission), any other value, such as one of values 3-255 may be used in other embodiments to request the temporary suspension. In some embodiments, a temporarily suspended session may be resumed at a specific time previously agreed upon by the two STAs, e.g. resumed at the beginning of a next set of wireless signals, which may be indicated in a parameter that is determined in the initial phase (e.g. exchanged in negotiation).

Figure 4B:
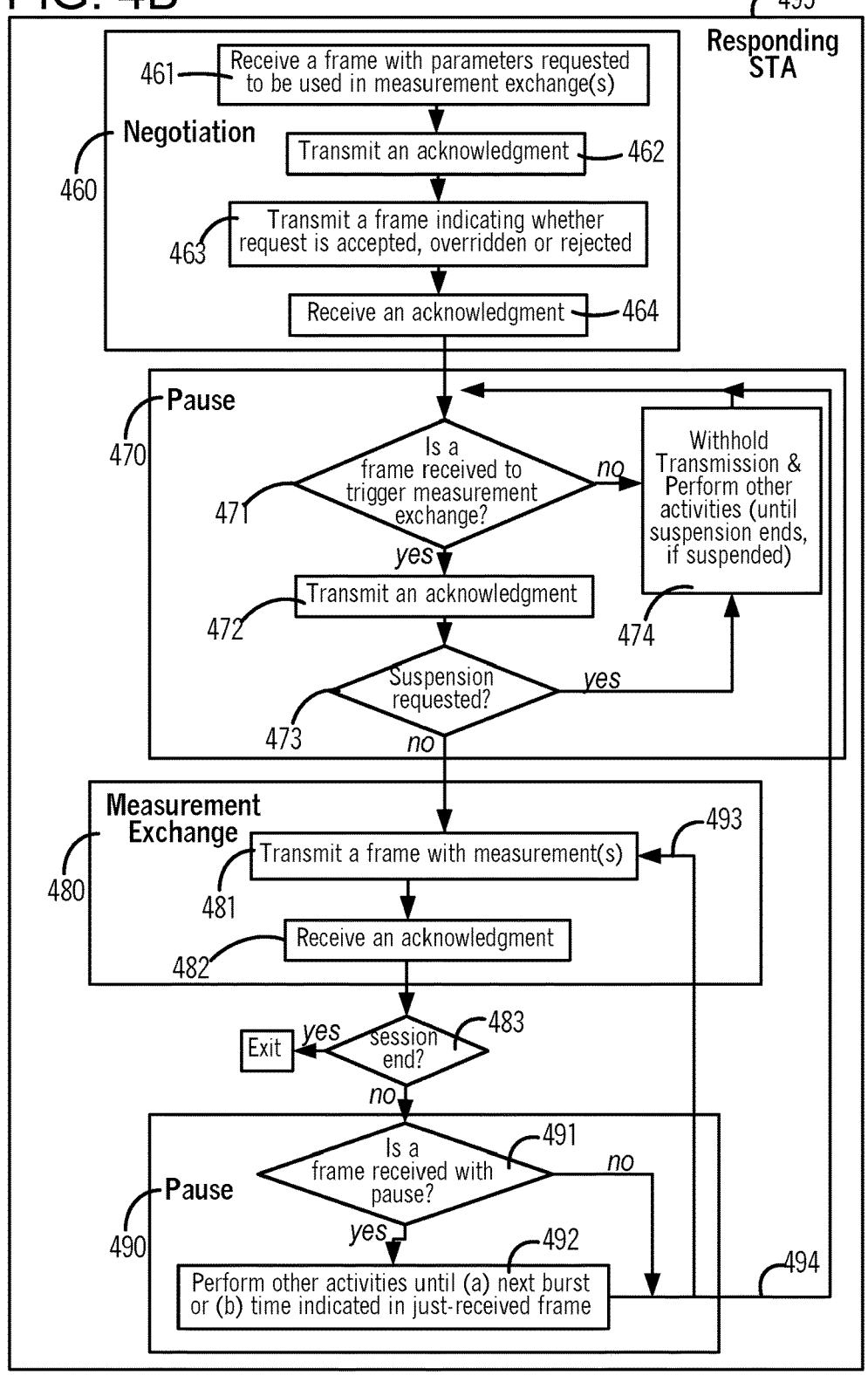

Several embodiments of an initiating STA of the type described above perform a procedure 400 illustrated in FIG. 4A for determining a positional relationship (e.g. distance and/or angle) between itself and a responding STA, as follows. Specifically, in an operation 410, the initiating STA performs determination of parameters (e.g. by negotiation), e.g. by transmitting in act 411 a frame containing scheduling and operational parameters that are being requested to be used, in measurement exchanges with the responding STA, receiving in act 412 an acknowledgment from the responding STA, receiving in act 413 a frame indicating whether the request is accepted, overridden or rejected, and transmitting in act 414 an acknowledgment to the responding STA. Operational parameters that are exchanged between STAs in a negotiation phase may identify, for example, physical signal characteristics, such as particular frequency channels, signal encoding, transmission power levels, signal polarity, signal phase, and channel separation (or channel spacing). Scheduling parameters that are also exchanged between STAs in the negotiation phase may identify, for example, a period between consecutive frames, timeout, a burst period, number of bursts in a session, and number of frames per burst.

Subsequently, in an act 421, the initiating STA determines if it is time to transmit a frame, in accordance with a scheduling parameter which indicates the time at which the first set of wireless signals begins. If the answer is no in act 421, the initiating STA may perform other acts (not in procedure 400), as per act 422, eventually returning to act 421. Examples of other acts that may be optionally performed in act 422 are transmissions of signals to other STAs. If the answer is yes in act 421, the initiating STA checks if a temporary suspension (by withholding signal transmission) is needed in act 423, and if not then performs one or more measurement exchange(s) in operation 430 in the normal manner, as described below. If the answer in act 423 is yes, e.g. when other acts unrelated to procedure 400 are to be performed at a higher priority, the initiating STA goes to act 424 and transmits a temporary suspension-identifying frame which can be any normal frame modified in a predetermined field to indicate a temporary suspension request (e.g. an FTM Request frame with Trigger=2), such as frame 305 (FIG. 3), as described above. Then the initiating STA goes to act 425 in which an acknowledgment is received (e.g. ACK 306), followed by act 422 in which signal transmission to the responding STA is withheld and optionally other acts are performed (unrelated to procedure 400) until the temporary suspension (implemented by signal transmission withholding) ends (e.g. after a predetermined duration of temporary suspension), followed by returning to act 421. Acts 421-425 (FIG. 4A) constitute a temporary suspension operation 420 in certain embodiments, as described herein.

An operation 430 of measurement exchange is performed by initiating STA, when no temporary suspension is needed and the answer is no in act 423 as follows. In an act 431, the initiating STA transmits a frame to trigger measurement exchange, such as frame 307 (FIG. 3), followed by receiving an acknowledgment in act 432 (not shown in FIG. 3). Thereafter, in an act 434, the initiating STA receives a frame with measurements (such as FTM_2 frame 308 in FIG. 3) in an act 434, followed by transmitting an acknowledgment in act 435 (such as ACK 309), which completes one measurement exchange (e.g. within Burst2 in FIG. 3). Hence, after act 435, the initiating STA goes to act 440 to check if the session is to end. A session may end in a normal manner in any one of several ways, depending on the embodiment. For example, a session may end when the frame received in act 434 has a Dialog Token field set to 0. As another example, the session may end when a number of signal sets, as indicated in a parameter determined during an initial phase (e.g. by negotiation), have occurred.

If the decision in act 440 is that the session ends, the initiating STA exits the procedure 400. If the decision in act 440 is that the session does not end, the initiating STA checks in act 451 whether a temporary suspension is needed (e.g. to perform higher priority tasks), and when no temporary suspension is needed returns to an earlier act. For example, when more frames are to be received in the current set of wireless signals, the initiating STA goes from act 440 via the no branch of act 451 (when no temporary suspension is needed), and via branch 453 to act 434. As another example, when there are no more frames to be received in the current set of wireless signals, but more signal sets are scheduled to occur, the initiating STA goes from act 440 via the no branch of act 451 (when no temporary suspension is needed), and via branch 454 to act 431. In act 451, if a temporary suspension is needed (in the middle of a set of wireless signals), the initiating STA goes to act 452 in which a frame is transmitted with a temporary suspension request (e.g. an FTM Request frame with Trigger=2, such as frame 305 in FIG. 3), followed by receipt of an acknowledgment (e.g. ACK 306) from the responding STA, after which one or more activities other than transmitting to the initiating STA are performed (activities unrelated to procedure 400)

until the temporary suspension ends. On completion of act 452, the initiating STA returns to an earlier act as noted above, e.g. via branch 453 to act 434 when more frames are to be received in the current set of wireless signals, or via branch 454 to act 431 when more signal sets are scheduled to occur.

Several embodiments of a responding STA of the type described above perform a procedure 495 illustrated in FIG. 4B for determining distance or angle between itself and an initiating STA, as follows. Specifically, in an operation 460, the responding STA performs parameter determination (e.g. by negotiation), e.g. by receiving in act 461 a frame containing scheduling and operational parameters that are being requested to be used in measurement exchanges by the initiating STA (e.g. frame 301 in FIG. 3), transmitting in act 462 an acknowledgment to the initiating STA (e.g. in frame 302), transmitting in act 463 a frame indicating whether the request is accepted, overridden or rejected (e.g. frame 303), and receiving in act 464 an acknowledgment from the initiating STA (e.g. in frame 304).

Subsequently, in an act 471, the responding STA determines if a frame has been received to trigger measurement exchange (e.g. frame 305 in FIG. 3). If the answer is no in act 471, the responding STA may withhold signal transmission to the initiating STA and optionally perform one or more activities other than transmitting to the initiating STA (activities unrelated to procedure 495) as per act 474, eventually returning to act 471. If the answer is yes in act 471, the responding STA goes to act 472 to transmit an acknowledgment and then goes to act 473 to check if a temporary suspension is requested (e.g. by receipt of an FTM Request frame with Trigger=2, such as frame 305 in FIG. 3). If the answer in act 473 is no, then the responding STA performs one or more measurement exchange(s) in operation 480 in the normal manner, as described below. If the answer in act 473 is yes (e.g. when the initiating STA is not available for any reason), then the responding STA goes to act 474 in which other acts are performed until the temporary suspension ends, followed by returning to act 471. Examples of other acts that may be optionally performed in act 474 are transmissions of signals to other STAs.

An operation 480 of measurement exchange is performed by responding STA, when the answer is no in act 473 as follows. In an act 481, the responding STA transmits a frame containing measurements, such as FTM_2 frame 308 (FIG. 3), followed by receiving an acknowledgment in act 482, such as ACK 309. After act 482, the responding STA goes to act 483 to check if the session is to end. As noted above, a session may end in a normal manner in any one of several ways, depending on the embodiment. If the decision in act 483 is that the session ends, the responding STA exits the procedure 495. If the decision in act 483 is that the session does not end, the responding STA goes to a temporary suspension operation 490, by checking in act 491 if a frame is received with a temporary suspension request therein (e.g. an FTM Request frame with Trigger=2). If the answer in act 491 is yes, then the responding STA goes to act 492 in which one or more activities other than transmitting to the initiating STA are performed until (a) the next set of wireless signals or alternatively (b) until a time indicated in the just-received frame (e.g. in a timer field therein). On completion of the temporary suspension in act 492 or alternatively when the answer in act 491 is no, the responding STA exits the temporary suspension operation 490, by returning to an earlier act. For example, when more frames are to be transmitted in the current set of wireless signals, the responding STA goes from act 492 via branch 493 to act 481.

As another example, when there are no more frames to be transmitted in the current set of wireless signals, but more signal sets are scheduled to occur, the responding STA goes from act 492 via branch 494 to act 471.

Figure 5:
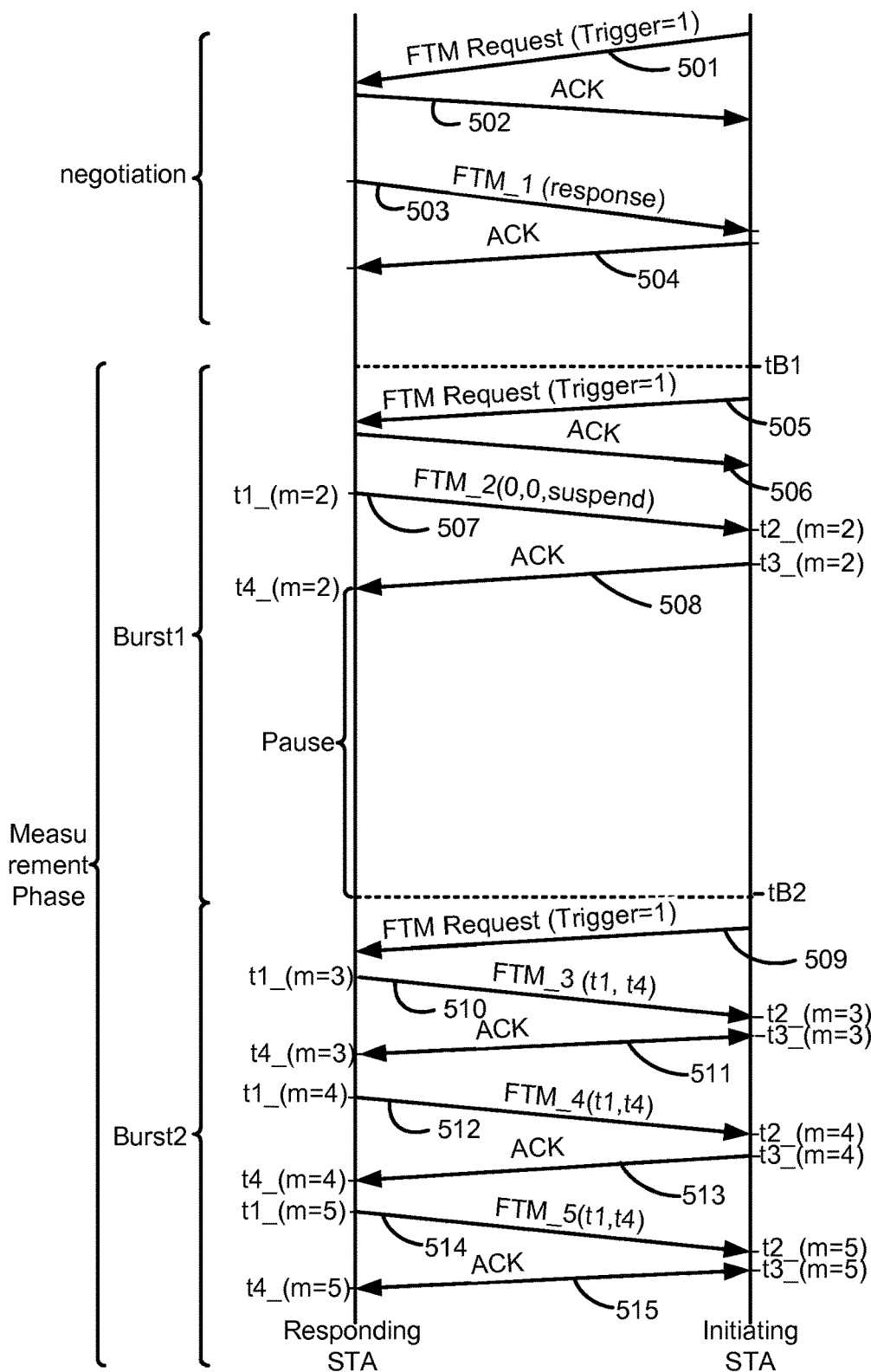
FIG. 5 illustrates a sequence of frames exchanged between an initiating STA and a responding STA in accordance with certain embodiments of the present disclosure.

In a procedure for determining distance or angle by use of timing measurements, as illustrated in FIG. 5, after parameter determination (e.g. by negotiation) in a normal manner by exchanging frames 501, 502, 503 and 504, an initiating STA may start a set of wireless signals ("Burst1" in FIG. 5) by transmitting a request in frame 505, and receive an ACK 506. After the set of wireless signals is started, the responding STA may request that the initiating STA temporarily suspend exchange of messages or frames, by setting a specific bit (e.g. to the value 1) in a specific field (e.g. in the field "TOD Error" or in the field "TOA Error" depending on the embodiment) in a frame 507 ("temporary suspension-identifying frame") wirelessly transmitted from the responding STA (which is a temporary suspension-requesting device or preempting) to the initiating STA (which is a temporarily suspended device or preempted device), followed by ACK 508. In several such embodiments, the temporary suspension of a current session may be implemented by the two STAs only up to the end of a current set of wireless signals at time tB2, in which case transmission of frames continues in a next scheduled set of wireless signals namely Burst2, unless a new set of scheduling and operational parameters are sent in the temporary suspension-identifying frame, such as frame 305 (FIG. 3) or frame 507 (FIG. 5).

In the absence of the new set of scheduling and operational parameters in frame 507, at the beginning of a next set of wireless signals Burst2, the initiating STA may wirelessly transmit a trigger frame 509, which is followed by exchange of frames (such as FTM_3 frame 510, followed by ACK 511, followed by FTM_4 frame 512, followed by ACK 513, and optionally FTM_5 frame 514 of Burst2), as per scheduling and operational parameters previously determined (e.g. by negotiation). When a new parameter in the trigger frame 509 indicates three FTMs in a set of wireless signals, then FTM_3 frame 510, FTM_4 frame 512, and FTM_5 frame 514 are transmitted in Burst2 as shown in FIG. 5. But, when there is no change in parameters and originally two FTMs were scheduled in a set of wireless signals, then FTM_3 frame 510 and FTM_4 frame 512 are transmitted in Burst2. Hence, no new parameter determination (e.g. by negotiation) is required after a temporary suspension completes at time tB2, prior to continuing the exchange of frames in the current session. Although in FIG. 5, trigger frame 509 is transmitted in Burst2 that immediately follows Burst1, depending on the duration of temporary suspension previously agreed upon by the two STAs, trigger frame 509 may be transmitted after any number of intervening signal sets subsequent to Burst1 in the current session, e.g. with the number of intervening signal sets (also called "preempted" signal sets) being specified in frame 507 which may be a temporary suspension-identifying frame.

Figure 6A:
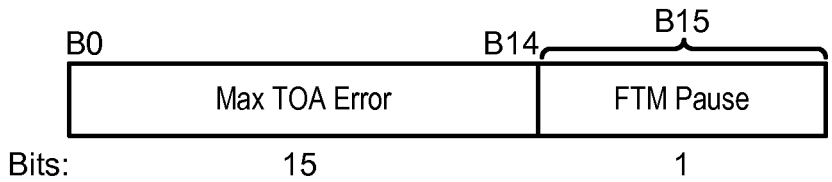
FIGS. 6A and 6B illustrate bits within a TOA Error field and a TOD Error field in accordance with certain embodiments of the present disclosure.
Figure 6B:
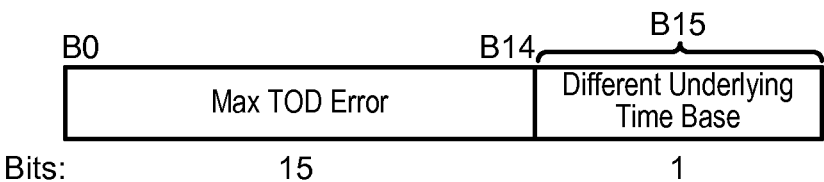

In certain embodiments of the type illustrated in FIG. 6A, the last bit in the TOA Error field (e.g. bit 16) may be set to the binary value 1 to indicate that the responding STA is requesting the initiating STA to temporarily suspend a current session in the procedure for determining distance and/or angle. In some embodiments of the type just described, the last bit in the TOD Error field may be re-defined to indicate that the underlying time base has changed (relative to the most-recently transmitted set of timestamp values) as shown in FIG. 6B, which is thus not limited to indicating TOD Not Continuous.

Figure 6C:
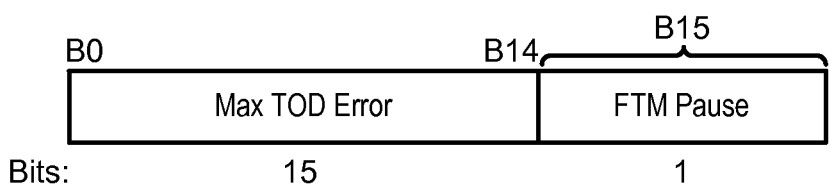
FIGS. 6C and 6D illustrate bits within a TOD Error field and a TOA Error field in accordance with some embodiments of the present disclosure.
Figure 6D:
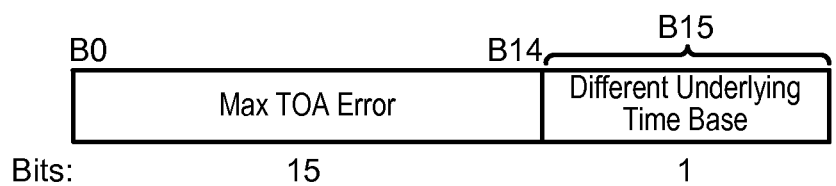

The just-described roles of the last bits in the TOA Error field and the TOD Error field may be reversed in other embodiments, e.g. as shown in FIGS. 6C and 6D. Specifically, in alternative embodiments of the type illustrated in FIG. 6C, the last bit in the TOD Error field may be set to the binary value 1, to indicate that the responding STA is requesting the initiating STA to temporarily suspend the procedure. In the just-described alternative embodiments, the last bit in the TOA Error field may be re-defined, to indicate that the underlying time base has changed as shown in FIG. 3E, which is thus not limited to indicating TOA Not Continuous.

Figure 7A:
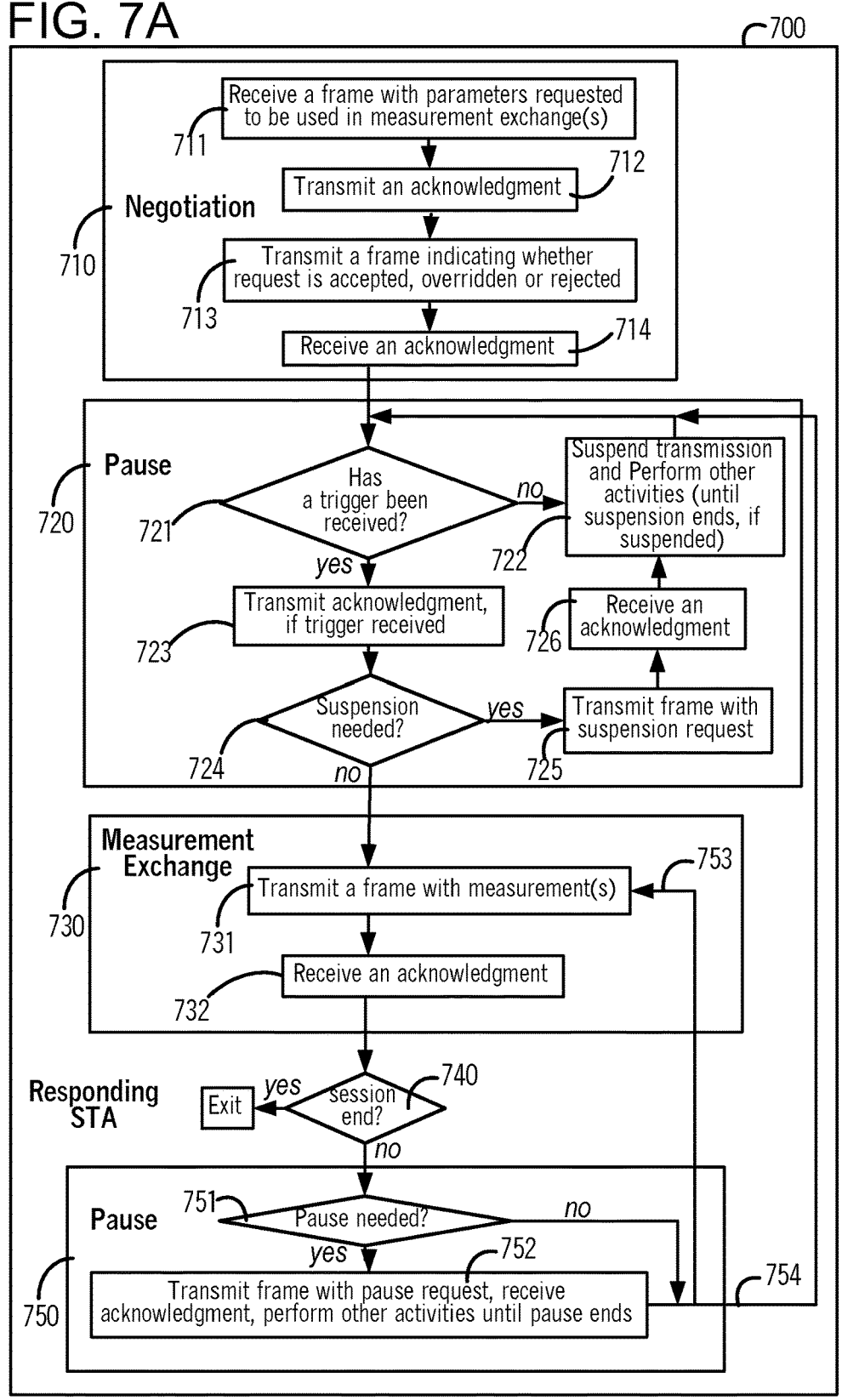

Several embodiments of a responding STA of the type described above perform a procedure 700 illustrated in FIG. 7A for determining distance or angle between itself and an initiating STA, as follows. Specifically, in an operation 710, the responding STA performs parameter determination (e.g. by negotiation), e.g. by performing one or more of acts 711-714 in a manner similar or identical to acts 461-464 described above in reference to FIG. 4B.

Subsequently, in an act 721, the responding STA determines if a frame has been received to trigger measurement exchange. If the answer is no in act 721, the responding STA suspends signal transmission to the initiating STA and optionally may perform one or more activities other than transmitting to the initiating STA as per act 722, eventually returning to act 721. Examples of other acts that may be optionally performed in act 722 are transmissions of signals to other STAs. If the answer is yes in act 721, the responding STA goes to act 723 to transmit an acknowledgment and then goes to act 724 to check if a temporary suspension is needed. If the answer in act 724 is no, then the responding STA performs one or more measurement exchange(s) in operation 730 in the normal manner, as described below. If the answer in act 724 is yes (e.g. when there are higher priority tasks to be done), then the responding STA goes to act 725 and transmits a frame with a temporary suspension request (e.g. by setting a last bit to the binary value 1 in the TOD Error field or alternatively in the TOA Error field in an FTM frame, depending on the embodiment). After act 725, the responding STA receives an acknowledgment in act 726, followed by act 722 in which other acts are performed until the temporary suspension ends, which is followed by a return to act 721.

An operation 730 of measurement exchange is performed by responding STA, when the answer is no in act 724, in a manner similar or identical to the above-described operation 480. Specifically, the responding STA performs acts 731 and 732 shown in FIG. 7A, in a manner similar or identical to act 481 and act 482 described above. Thereafter, the responding STA performs act 740 to check if the session has ended, and if yes, exits the procedure. If the session has not ended, then the responding STA goes from act 740 to temporarily suspend operation 750, in which act 751 checks if a temporary suspension is needed and if so goes to act 752 in which a frame with a temporary suspension request is transmitted (e.g. by setting a last bit to the binary value 1 in the TOD Error field or alternatively in the TOA Error field in an FTM frame, depending on the embodiment), followed by receiving an acknowledgment, followed by performing one or more activities other than transmitting to the initiating STA (e.g. any acts unrelated to the procedure 700) until temporary suspension ends. On completion of act 752, or alternatively if the answer in act 751 is no, then the responding STA returns to an earlier act, e.g. to act 731 via branch 753 if additional frames are to be transmitted in the current set of wireless signals, or to act 721 via branch 754 if additional signal sets are scheduled in the current session.

Several embodiments of an initiating STA of the type described above perform a procedure 795 illustrated in FIG. 7B for determining distance or angle between itself and a responding STA, as follows. Specifically, in an operation 760, the initiating STA performs parameter determination (e.g. by negotiation), e.g. by performing one or more of acts 761-764 in a manner similar or identical to acts 411-414 described above in reference to FIG. 4A. After parameter determination (e.g. by negotiation), the initiating STA performs measurement exchange, e.g. by performing one or more of acts 771-774 in a manner similar or identical to acts 431-435 described above in reference to FIG. 4A. Thereafter, in an act 781, the initiating STA determines if the session is to end (e.g. as described above in reference to act 440 in FIG. 4A), and if so exits the procedure.

If the answer in act 781 is no, i.e. the session is not to end, then the initiating STA checks in act 791 whether a temporary suspension has been requested. As noted above, a temporary suspension may be requested in a frame with measurements that is received in act 773 (e.g. by receipt of an FTM frame in which a last bit in the TOD Error field or alternatively the TOA Error field is set to the binary value 1, depending on the embodiment). If the answer in act 791 is yes, the initiating STA goes to act 792 and performs one or more activities other than transmitting to the responding STA until the temporary suspension ends. When the temporary suspension ends in act 792, or when no temporary suspension is requested in act 791, the initiating STA goes via branches 784 or 785 to act 773 or act 771, in a manner similar or identical to act 434 or act 431 described above in reference to FIG. 4A.

Figure 8:
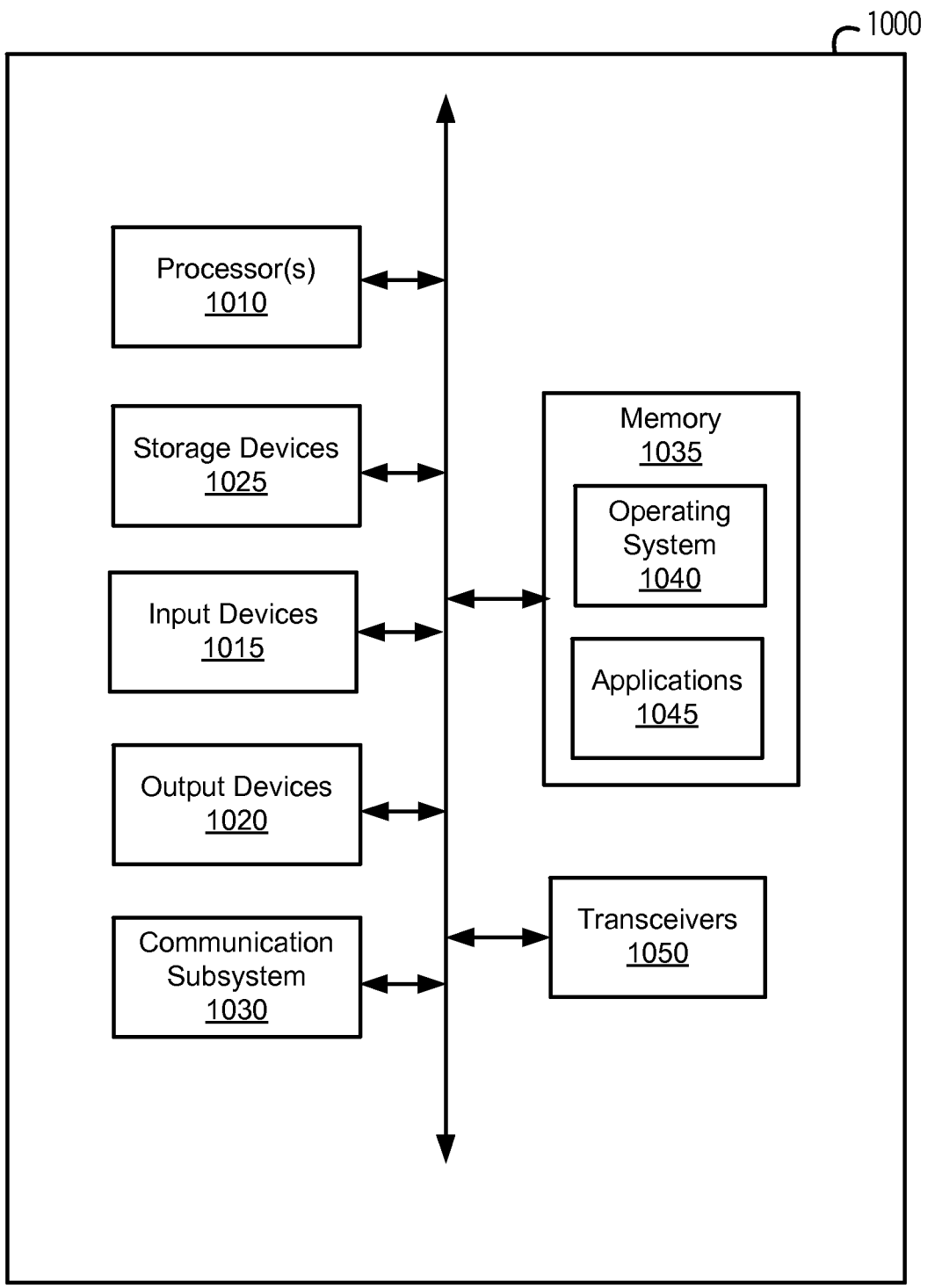
FIG. 8 is an example computer system that can be used for determining a positional relationship (e.g. distance or angle) between electronic devices, in accordance with certain embodiments of the present disclosure.

An example of an electronic device in which various aspects of the disclosure may be implemented will now be described in reference to a computer system illustrated in FIG. 8. According to one or more aspects, a computer system as illustrated in FIG. 8 may be incorporated as part of an electronic device, which may implement, perform, and/or execute any and/or all of the features, methods, and/or method steps described herein and illustrated in FIG. 4A, 4B, 7A or 7B. For example, computer system 1000 may represent some of the components of a hand-held device. A hand-held device may be any computing device with an input sensory unit, such as a wireless receiver or modem. Examples of a hand-held device include but are not limited to video game consoles, tablets, smart phones, televisions, laptops, and mobile devices or mobile stations. In some embodiments, the computer system 1000 is configured to implement any of the methods described above, e.g. in reference to FIG. 4A, 4B, 7A or 7B.

FIG. 8 provides a schematic illustration of one embodiment of a computer system 1000 that can perform the methods provided by various other embodiments, as described herein, and/or can function as the host computer system, a remote kiosk/terminal, a point-of-sale device, a mobile device, a set-top box, and/or a computer system that implements an initiating STA or a responding STA as described above. FIG. 8 is meant only to provide a generalized illustration of certain components of an STA as described above, any and/or all of which may be utilized as appropriate. FIG. 8, therefore, broadly illustrates how individual system elements of an STA may be implemented in a relatively separated or relatively more integrated manner.

The computer system 1000 is shown comprising hardware elements that can be electrically coupled via a bus 1005 (or may otherwise be in communication, as appropriate). The hardware elements may include one or more processors 1010, including without limitation one or more general-purpose processors and/or one or more special-purpose processors (such as digital signal processing chips, graphics acceleration processors, and/or the like); one or more input devices 1015, which can include without limitation a camera, wireless receivers, wireless sensors, a mouse, a keyboard and/or the like; and one or more output devices 1020, which can include without limitation a display unit, a printer and/or the like. In some embodiments, the one or more processor 1010 may be configured to perform a subset or all of the functions described above. The processor 1010 may comprise a general processor and/or and application processor, for example. In some embodiments, the processor is integrated into an element that processes visual tracking device inputs and wireless sensor inputs.

The computer system 1000 may further include (and/or be in communication with) a storage device 1025, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 1000 might also include a communications subsystem 1030, which can include without limitation a modem, a network card (wireless or wired), an infrared communication device, a wireless communication device and/or chipset (such as a Bluetooth device, an 802.11 device, a WiFi device, a WiMax device, cellular communication facilities, etc.), and/or the like. The communications subsystem 1030 may permit data to be exchanged with a network (such as the network described below, to name one example), other computer systems, and/or any other devices described herein. In many embodiments, the computer system 1000 will further comprise a memory 1035, which can include any non-transitory memory, e.g. a RAM or ROM device, as described above. In some embodiments, communications subsystem 1030 may interface with transceiver(s) 1050 configured to transmit and receive wireless signals from other STAs, such as APs or mobile devices, e.g. in conformance with IEEE 802.11. Some embodiments of communications subsystem 1030 may include a separate wireless receiver or receivers, and a separate wireless transmitter or transmitters.

The computer system 1000 also can comprise software elements, shown as being currently located within the memory 1035, including an operating system 1040, device drivers, executable libraries, and/or other code, such as one or more application programs 1045, which may comprise computer programs provided by various embodiments, and/or may be designed to implement methods, and/or configure systems, provided by other embodiments, as described herein. Merely by way of example, one or more procedures described with respect to the method(s) discussed above, for example as described with respect to FIG. 4A, 4B, 7A or 7B, might be implemented as code and/or instructions executable by a computer (and/or a processor within a computer); in an aspect, then, such code and/or instructions can be used to configure and/or adapt a general purpose computer (or other device) to perform one or more operations of an STA in accordance with the described methods.

A set of these instructions and/or code might be stored on a computer-readable storage medium, such as the storage device(s) 1025 described above. In some cases, the storage medium might be incorporated within a computer system, such as computer system 1000. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer system 1000) to perform methods in accordance with the disclosure. For example, some or all of the procedures of the methods described in reference to one or more of FIG. 4A, 4B, 7A or 7B may be performed by the computer system 1000 in response to processor 1010 executing one or more sequences of one or more instructions (which might be incorporated into the operating system 1040 and/or other code, such as one or more application programs 1045) contained in the memory 1035. Such instructions may be read into the memory 1035 from another computer-readable medium, such as one or more of the storage device(s) 1025. Merely by way of example, execution of the sequences of instructions contained in the memory 1035 might cause the processor(s) 1010 to perform one or more procedures of the methods described herein, for example methods described with respect to FIG. 4A, 4B, 7A or 7B.

The terms "machine-readable medium" and "computer-readable medium," as used herein, refer to any medium that participates in providing data that causes a machine to operate in a specific fashion. In an embodiment implemented using the computer system 1000, various computer-readable media might be involved in providing instructions/code to processor(s) 1010 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1025. Volatile media include, without limitation, dynamic memory, such as the memory 1035. Transmission media include, without limitation, coaxial cables, copper wire and fiber optics, including the wires that comprise the bus 1005, as well as the various components of the communications subsystem 1030 (and/or the media by which the communications subsystem 1030 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, any other physical medium with readable patterns, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 1010 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1000. These signals, which might be in the form of electromagnetic signals, acoustic signals, optical signals and/or the like, are all examples of carrier waves on which instructions can be encoded.

The communications subsystem 1030 (and/or components thereof) generally will receive the signals, and the bus 1005 then might carry the signals (and/or the data, instructions, etc. carried by the signals) to the memory 1035, from which the processor(s) 1010 retrieves and executes the instructions. The instructions received by the memory 1035 may optionally be stored on a storage device 1025 (which is non-transitory) either before or after execution by the processor(s) 1010. Memory 1035 may contain at least one database according to any of the databases and methods described herein. Memory 1035 may thus store any of the values discussed in any of the present disclosures, including FIG. 4A, 4B, 7A or 7B and related descriptions.

The methods described in FIG. 4A, 4B, 7A or 7B may be implemented by various blocks in FIG. 8. For example, processor 1010 (FIG. 8) may be configured to perform any of the operations in FIG. 4A, 4B, 7A or 7B. Storage device 1025 may be configured to store an intermediate result, such as a time-table showing times at which one or more signal sets are to start and/or end, within any of the operations mentioned herein. Storage device 1025 may also contain a database consistent with any of the present disclosures. The memory 1035 may similarly be configured to record signals, representation of signals, or database values necessary to perform any of the functions described in any of the blocks mentioned herein. Results that may need to be stored in a temporary or volatile memory, such as RAM, may also be included in memory 1035, and may include any intermediate result similar to what may be stored in storage device 1025. Input device 1015 may be configured to receive wireless signals from satellites and/or base stations according to the present disclosures described herein. Output device 1020 may be configured to display images, print text, transmit signals and/or output other data depending on the embodiment.

In some embodiments, one or more processors 1010 (FIG. 8) may be configured to perform either operation 410 (in an initiating STA implemented by computer system 1000) or operation 460 (in a responding STA implemented by computer system 1000), for determining (e.g. by negotiating) a plurality of parameters to be used in a phase to exchange measurements, in the procedure to determine a positional relationship (e.g. distance and/or angle), and such processor(s) may be comprised in a first means. In such embodiments, one or more processors 1010 (FIG. 8) may be further configured to perform either act 424 (in the initiating STA) or act 473 (in the responding STA), for transmitting to or receiving from other such processor(s), an indication to temporarily suspend the phase, during a current set of wireless signals among the multiple sets of wireless signals, and such processor(s) 1010 (FIG. 8) may be comprised in a second means. In certain embodiments, one or more processors 1010 (FIG. 8) may be further configured to perform either act 422 (in the initiating STA) or act 474 (in the responding STA), to withhold transmission of one or more signals until temporary suspension ends, and such processor(s) 1010 (FIG. 8) may be comprised in a third means. In several embodiments, one or more processors 1010 (FIG. 8) may be additionally configured to perform act 481 (in the responding STA) for transmitting one or more new measurements in a new set of wireless signals without repeating the parameter determination (e.g. without repeating negotiating) and without transmitting one or more withheld measurements, and such processor(s) may be comprised in a fourth means.

Thus, one or more processors 1010 and/or transceiver(s) 1050 (FIG. 8) of STAs may be configured to transmit and receive wireless signals in conformance with IEEE 802.11, by performing one or more acts and/or operations illustrated in FIG. 4A, 4B, 7A or 7B as described above. Depending on some aspects of certain embodiments, such a combination of one or more processors 1010 and/or transceiver(s) 1050 (FIG. 8) may be configured to transmit a fine timing measurement request frame either as a broadcast or as an individually addressed frame. Thus, in a negotiation phase of the type described above, a combination of one or more processors 1010 and/or transceiver(s) 1050 (FIG. 8) in an STA implemented by computer system 1000 may receive a fine timing measurement request frame and respond by sending a fine timing measurement response frame, when the STA does not accept one or more operational or scheduling parameters included in the fine timing measurement request message. After completion of negotiation, an STA implemented by computer system 1000 of the type described above may include one or more processors 1010 and/or transceiver(s) 1050 (FIG. 8) configured (in hardware and/or software) to pause a measurement phase in a current session with one STA, and during a period of the pause of the current session, start and suspend a new session with another STA, as illustrated in FIGS. 1, 2A and 2B (described above).

Attention is drawn next to FIG. 9 which is flow diagram illustrating an example method 1100, that may be implemented in a first electronic device, for use in determining at least one positional relationship between itself and a second electronic device, in accordance with certain embodiments of the present disclosure.

At act 1102, the first electronic device may determine, with at least the second electronic device, a plurality of parameters for a phase to exchange measurements, wherein the plurality of parameters identify multiple sets of wireless signals scheduled to be transmitted during the phase to exchange measurements by the first electronic device, the second electronic device, or a combination of the first electronic device and the second electronic device.

At act 1104, the first electronic device may receive from the second electronic device or transmit to the second electronic device, an indication to temporarily suspend participating in the phase to exchange measurements during a current set of wireless signals among the multiple sets of wireless signals.

At act 1106, the first electronic device, based on the indication to temporarily suspend participation in the phase to exchange measurements, may withhold transmission of one or more of the multiple sets of wireless signals scheduled to be transmitted by the first electronic device.

At act 1108, the first electronic device may transmit to or receive from the second electronic device, a new set of wireless signals among the multiple sets of wireless signals, the new set of wireless signals being scheduled to be transmitted subsequent to the one or more of the multiple sets of wireless signals.

In certain instances, the withholding transmission, e.g., at act 1106, may be performed in response to receipt of a frame from the second electronic device. In certain instances, the transmission of the new set of wireless signals (e.g., at act 1108) may, for example be based, at least in part, on a specific time identified in a received frame. In certain implementations, such a field in the frame may have been specified as unused or the like in a previously published industry standard, and such a field may be used (e.g., is set to a value, etc.) to convey the indication to temporarily suspend participation in the phase to exchange measurements, or some other information that may be used in method 1100.

In certain implementations, the measurements in method 1100 may comprise or otherwise indicate, at least in part, a time of arrival measurement, a time of departure measurement, or both. In certain implementations, the measurements in method 1100 may comprise or otherwise indicate, at least in part, a difference between a time of arrival measurement and a time of departure measurement. In certain implementations, a positional relationship in method 1100 may be indicative of a distance (estimated) between an antenna of the first electronic device and an antenna of the second electronic device. In certain implementations, a positional relationship in method 1100 may be indicative of an angular (angle) distance (estimated) between an antenna of the first electronic device and an antenna of the second electronic device.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the embodiment. Rather, the preceding description of the embodiments will provide those skilled in the art with an enabling description for implementing embodiments. Various changes may be made in the function and arrangement of elements without departing from the spirit and scope of the described embodiments.

Also, some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the embodiment. Also, a number of steps may be undertaken before, during, or after the above elements are considered. Accordingly, the above description does not limit the scope of the disclosure.

Various examples have been described. These and other examples are within the scope of the following claims.

The invention claimed is:

1. A method for use in determining at least one positional relationship between two or more electronic devices, the method comprising:

in a first electronic device of the two or more electronic devices, determining, with at least a second electronic device of the two or more electronic devices, a plurality of parameters for a phase to exchange measurements, wherein the plurality of parameters identify multiple sets of wireless signals scheduled to be transmitted during the phase to exchange measurements by the first electronic device, the second electronic device, or a combination of the first electronic device and the second electronic device;

in the first electronic device, receiving from the second electronic device or transmitting to the second electronic device, an indication to temporarily suspend participating in the phase to exchange measurements during a current set of wireless signals among the multiple sets of wireless signals;

in the first electronic device, based on the indication to temporarily suspend participation in the phase to exchange measurements, withholding transmission of one or more of the multiple sets of wireless signals scheduled to be transmitted by the first electronic device; and in the first electronic device, transmitting to or receiving from the second electronic device, a new set of wireless signals among the multiple sets of wireless signals, the new set of wireless signals being scheduled to be transmitted subsequent to the one or more of the multiple sets of wireless signals;

wherein the withholding transmission is performed in response to receipt of a frame from the second electronic device.

2. The method of claim 1 wherein transmission of the new set of wireless signals is based on a specific time identified in said frame.

3. The method of claim 1 wherein:

a field in the frame is unused in a published industry standard; and the field is set to a value to convey the indication to temporarily suspend participation in the phase to exchange measurements.

4. The method of claim 1 wherein the measurements comprise a time of arrival measurement and a time of departure measurement.

5. The method of claim 1 wherein the measurements comprise a difference between a time of arrival measurement and a time of departure measurement.

6. The method of claim 1 wherein the at least one positional relationship is indicative of a distance between an antenna of the first electronic device and an antenna of the second electronic device.

7. The method of claim 1 wherein the at least one positional relationship is indicative of an angle between an antenna of the first electronic device and an antenna of the second electronic device.

8. A non-transitory computer-readable storage medium comprising a plurality of instructions, which, when executed by a processor perform steps in a method to determine at least one positional relationship between a pair of electronic devices, the plurality of instructions comprising:
 instructions in a first electronic device among the pair of electronic devices, to determine with at least a second electronic device of the pair of electronic devices, a plurality of parameters for a phase to exchange measurements, wherein the plurality of parameters identify multiple sets of wireless signals scheduled to be transmitted during the phase to exchange measurements by the first electronic device, the second electronic device, or a combination of the first electronic device and the second electronic device;
 in the first electronic device, instructions to receive from the second electronic device or transmit to the second electronic device, an indication to temporarily suspend participating in the phase to exchange measurements during a current set of wireless signals among the multiple sets of wireless signals;
 in the first electronic device, responsive to the indication to temporarily suspend participation in the phase to exchange measurements, instructions to withhold transmission of one or more of the multiple sets of wireless signals scheduled to be transmitted by the first electronic device; and
 in the first electronic device, instructions to transmit to or receive from the second electronic device, a new set of wireless signals among the multiple sets of wireless signals, the new set of wireless signals being scheduled to be transmitted subsequent to the one or more of the multiple sets of wireless signals;
 wherein the instructions to withhold transmission are executed in response to receipt of a frame from the second electronic device.

9. The non-transitory computer-readable storage medium of claim 8 wherein transmission of the new set of wireless signals is based on a specific time identified in said frame.

10. The non-transitory computer-readable storage medium of claim 8 wherein:
 a field in the frame is unused in a published industry standard; and
 the field is set to a value to convey the indication to temporarily suspend participation in the phase to exchange measurements.

11. The non-transitory computer-readable storage medium of claim 8 wherein the at least one positional relationship is indicative of a distance between an antenna of the first electronic device and an antenna of the second electronic device.

12. The non-transitory computer-readable storage medium of claim 8 wherein the at least one positional relationship is indicative of an angle between an antenna of the first electronic device and an antenna of the second electronic device.

13. A first electronic device comprising: a transceiver;
 a memory;
 a processor operatively coupled to the transceiver and the memory and wherein the processor and memory are configured to:
 determine, with at least a second electronic device via the transceiver, a plurality of parameters for a phase to exchange measurements to determine at least one positional relationship, wherein the plurality of parameters identify multiple sets of wireless signals scheduled to be transmitted during the phase to exchange measurements by the first electronic device, the second electronic device, or a combination of the first electronic device and the second electronic device;
 with the transceiver, receive from the second electronic device or transmit to the second electronic device, an indication to temporarily suspend participating in the phase to exchange measurements during a current set of wireless signals among the multiple sets of wireless signals;
 based on the indication to temporarily suspend participation in the phase to exchange measurements, withhold transmission of one or more of the multiple sets of wireless signals scheduled to be transmitted by the first electronic device; and
 with the transceiver transmit to or receive from the second electronic device, a new set of wireless signals among the multiple sets of wireless signals, the new set of wireless signals being scheduled to be transmitted subsequent to the one or more of the multiple sets of wireless signals;
 wherein the withholding transmission is performed in response to receipt of a frame from the second electronic device.

14. The first electronic device of claim 13 wherein transmission of the new set of wireless signals is based on a specific time identified in said frame.

15. The first electronic device of claim 13 wherein:
 a field in the frame is unused in a published industry standard; and
 the field is set to a value to convey the indication to temporarily suspend participation in the phase to exchange measurements.

16. The first electronic device of claim 13 wherein the measurements comprise a time of arrival measurement and a time of departure measurement.

17. The first electronic device of claim 13 wherein the measurements comprise a difference between a time of arrival measurement and a time of departure measurement.

18. The first electronic device of claim 13 wherein the at least one positional relationship is indicative of a distance between an antenna of the first electronic device and an antenna of the second electronic device.

19. The first electronic device of claim 13 wherein the at least one positional relationship is indicative of an angle between an antenna of the first electronic device and an antenna of the second electronic device.

20. A first apparatus to perform a procedure to determine at least one positional relationship between a pair of apparatuses wirelessly connected to one another, the apparatus comprising:
 means for determining, with at least a second apparatus, a plurality of parameters for a phase to exchange measurements to determine the at least one positional relationship, wherein the plurality of parameters identify multiple sets of wireless signals scheduled to be transmitted during the phase to exchange measurements by the first apparatus, the second apparatus, or a combination of the first apparatus and the second apparatus;

means for receiving from or transmitting to the second apparatus, an indication to temporarily suspend participating in the phase to exchange measurements during a current set of wireless signals among the multiple sets of wireless signals;

means for withholding transmission of one or more of the multiple sets of wireless signals scheduled to be transmitted by the first apparatus, responsive to the indication to temporarily suspend participation in the phase to exchange measurements; and means for transmitting or receiving, a new set of wireless signals among the multiple sets of wireless signals, the new set of wireless signals being scheduled to be transmitted subsequent to the one or more of the multiple sets of wireless signals;

wherein the withholding transmission is performed in response to receipt of a frame from the second electronic device.

21. The first apparatus of claim 20 wherein transmission of the new set of wireless signals is based on a specific time identified in said frame.

22. The first apparatus of claim 20 wherein:
a field in the frame is unused in a published industry standard; and
the field is set to a value to convey the indication to temporarily suspend participation in the phase to exchange measurements.

23. The first apparatus of claim 20 wherein the measurements comprise a time of arrival measurement and a time of departure measurement.

24. The first apparatus of claim 20 wherein the measurements comprise a difference between a time of arrival measurement and a time of departure measurement.

25. The first apparatus of claim 20 wherein the at least one positional relationship is indicative of a distance between an antenna of the first electronic device and an antenna of the second electronic device.

26. The first apparatus of claim 20 wherein the at least one positional relationship is indicative of an angle between an antenna of the first electronic device and an antenna of the second electronic device.

* * * * *